United States Patent [19]

Rogowsky

[11] 4,208,691

[45] Jun. 17, 1980

[54] CONTROL OF INVERTER CIRCUIT-BREAKER

[75] Inventor: York Rogowsky, Berlin, Fed. Rep. of Germany

[73] Assignee: LICENTIA Patent-Verwaltungs-G.m.b.H., Frankfurt am Main, Fed. Rep. of Germany

[21] Appl. No.: 944,317

[22] Filed: Sep. 21, 1978

[30] Foreign Application Priority Data

Sep. 22, 1977 [DE] Fed. Rep. of Germany ....... 2742997

[51] Int. Cl.² .......................................... H02H 7/122
[52] U.S. Cl. ...................................... 361/79; 363/50; 363/56
[58] Field of Search ........................ 361/79, 30, 86, 83, 361/92, 93, 94, 78; 363/50, 51, 55, 56, 57, 58; 307/252 M

[56] References Cited

U.S. PATENT DOCUMENTS

| 3,683,264 | 8/1972 | Schieman et al. | 361/79 X |
| 3,851,322 | 11/1974 | Compoly et al. | 361/79 X |
| 3,992,659 | 11/1976 | Ekstrom | 363/51 |
| 4,016,468 | 4/1977 | Graf | 361/79 X |

*Primary Examiner*—Patrick R. Salce
*Attorney, Agent, or Firm*—Spencer & Kaye

[57] ABSTRACT

A direct current, high-speed circuit breaker which is connected in series at the direct current side of one of a plurality of inverters connected in parallel in a high voltage transmission system, and which is caused to open when the magnitude of the direct current to the one inverter exceeds a threshold value, is further controlled to open in response to the occurrence of a commutation failure only when such failure occurs simultaneously with reduction of the commutation voltage of the one inverter below a rated value by more than a first predetermined magnitude such that proper operation of the one inverter is no longer assured, and the threshold value of the direct current is increased from a normal value to a selected higher value in response to a reduction of the commutation voltage below the rated value by more than a second predetermined magnitude which is less than the first predetermined magnitude.

3 Claims, 9 Drawing Figures

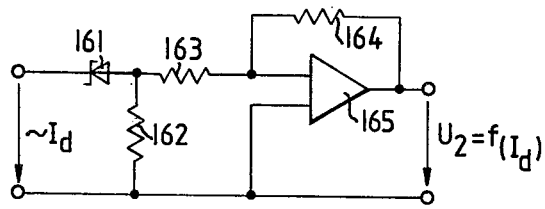
FIG.2
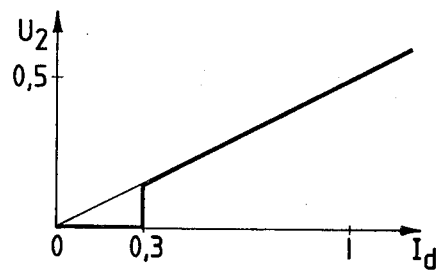
FIG.3
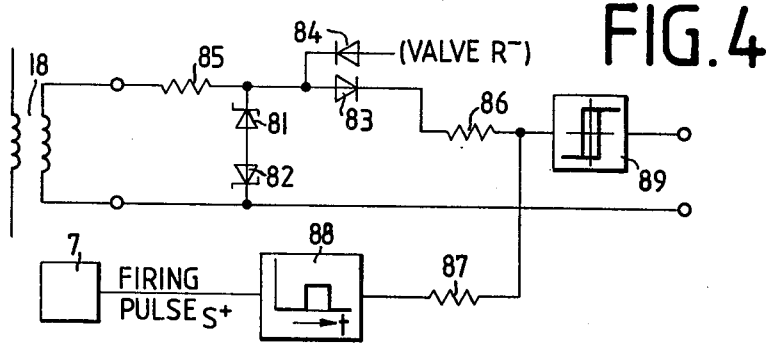
FIG.4
FIG.5a
FIG.5b
FIG.5c
FIG.5d
FIG.5e

CONTROL OF INVERTER CIRCUIT-BREAKER

BACKGROUND OF THE INVENTION

The present invention relates to a method for operating a D.C. high-speed circuit breaker which can be triggered by overcurrent, particularly for disconnecting a triggered inverter which is connected in parallel with other inverters in a high-voltage D.C. transmission system.

A high-speed circuit breaker of this type is disclosed for example, in the Technische Mitteilungen [Technical News] AEG-TELEFUNKEN 66 (1976), Issue No. 5, at pages 218–219.

In high-voltage D.C. transmission systems containing several inverters connected in parallel, it is necessary to provide over-current protection for the individual inverters when they undergo a commutation failure. According to the prior art, in order to protect such an inverter, it is then necessary to shut down the entire system, until the inverter subject to the malfunction is again working properly or has been disconnected. If the above-mentioned D.C. high-speed circuit breaker is provided in the system, it will disconnect the inverter upon every occurrence of such a malfunction. However, particularly in systems designed with a very small voltage reserve, commutation failures occur even for a very slight drop in the mains voltage. Such failures can easily be overcome within, for example, 20 ms by control measures, such as for example, a so-called "catch circuit", or merely by the influence of a quenching angle adjustment as disclosed in the periodical ETZ-A, Volume 89 (1968), Issue No. 9, at page 218. Even in these cases, however, the D.C. high-speed circuit breaker will interrupt the overcurrent while it is developing and thus terminate it. But this leads to a disconnection in every case of a disturbance, however harmless.

SUMMARY OF THE INVENTION

It is an object of the present invention to cause disconnections to be effected only in those cases in which they are necessary.

This and other objects are achieved, according to the invention by monitoring commutation failures of the inverter itself and the associated drop in the commutation voltage at the inverter, opening the high-speed circuit breaker only when the commutation voltage drops by more than a minimum value which no longer guarantees the proper operation of the inverter, and, at the same time, raising the threshold value for the overcurrent-responsive opening of the high-speed circuit breaker when the commutation voltage experiences a slight drop.

This method according to the invention serves to limit the disconnections of inverters to those cases in which the overcurrent would cause damage, for example to the semiconductor devices of the inverter.

Independently of this commutation-failure control, the high-speed circuit breaker must be able to be opened solely as a function of the current, based on a threshold value which must still be coordinated with the overcurrent arising in the case of a simple commutation failure. According to a further feature of the method according to the invention, the minimum value of the commutation voltage drop at which the high-speed circuit breaker is triggered is set a little above the stationary voltage limit for inverter operation of an inverter designed to have only a small voltage reserve. The limit value of the residual voltage, determined by the minimum value of the commutation voltage drop, is advantageously made dependent on the direct current through the high-voltage direct current transmission system to the extent that stationary operation of the inverter in dependence on the current is still possible. Thus greater reductions in voltage are permissible for a small direct current than for operation at full direct current.

It will be understood that a commutation failure is occuring when the current through a valve of the inverter is not properly commutating to another valve but instead is flowing on through said valve. By stationary voltage limit is meant the lowest line voltage at which an orderly commutation at the lowest firing angle for the valves still is possible. The voltage reserve of an inverter is determined by the extinction angle, which always is chosen a little wider than necessary for stationary operation in order to secure commutation at voltage drops. The voltage reserve thus determines up to which voltage drop, i.e. at which residual voltage, commutation still is safe. At safe commutation the inverter will be in stationary operation.

BRIEF DESCRIPTION OF THE DRAWINGS

FIG. 2 is a circuit diagram of a function generator used in the protection circuit according to FIG. 1.

FIG. 3 shows a diagram of a preferred function generated by the function generator according to FIG. 2.

FIG. 4 is a circuit diagram of a commutation failure sensing element used in the protetion circuit according to FIG. 1.

FIGS. 5a to 5e show signal waveforms at various points in the circuit of FIG. 4.

DESCRIPTION OF THE PREFERRED EMBODIMENTS

Figure 1:
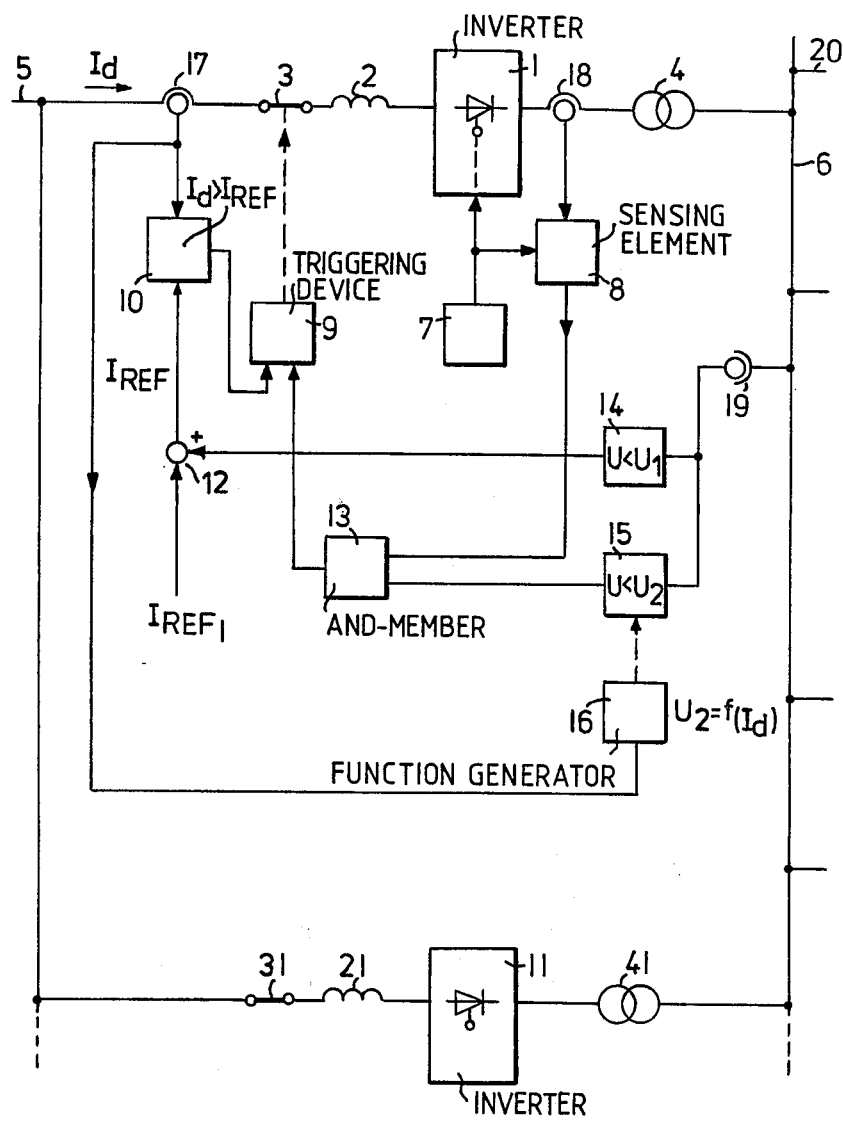
FIG. 1 is a basic diagram of an overcurrent protection circuit for protecting an inverter in a high-voltage direct current transmission system in accordance with the invention.

In the circuit shown in the Figure, inverters 1 and 11 connected in parallel with one another, and possibly with other parallel-connected inverters (not shown here), connect a direct current line 5 to an A.C. bus-bar 6 from which individual lines 20 branch off to distribute the power. The inverter 1, whose controllable devices are cyclically fired by a control unit 7, has connected to it a D.C. high-speed circuit breaker 3 and a choke coil 2 on the supply side, and a transformer 4 on the load side. In the same way, the inverter 11 has connected to it a D.C. high-speed circuit breaker 31 and a choke coil 21 on the supply side, and a transformer 41 on the load side.

In order to trigger the high-speed circuit breaker 3 into its open state due to an overcurrent $I_d$ by the method according to the invention, when the inverter experiences a commutation failure, there is provided a control circuit which includes a commutation failure sensing element 8. Element 8 is connected to both the output of control device 7 and a current transformer 18 and is constructed to detect the existence of a commutation failure in that, upon the occurrence of such a failure, a firing impulse delivered by the control device 7 to a controllable device of inverter 1 does not produce any corresponding current through current transformer 18.

At the same time, commutation voltage drops at inverter 1 are detected by means of two comparison, or threshold, elements 14 and 15 whose inputs are connected to bus 6 via a voltage transformer 19. If the voltage drop is large, i.e. if the bus voltage U falls below a predetermined minimum voltage value $U_2$, at which satisfactory operation of the inverter is no longer guaranteed, comparison element 15 produces a signal which is supplied to an AND-member 13 together with the signal produced by the commutation failure sensing element 8 upon the occurrence of a commutation failure in inverter 1. If both signals are present simultaneously, AND-member 13 supplies an output signal to triggering device 9 which is connected to operate the D.C. high-speed circuit breaker 3, so that the circuit breaker opens.

The normal overcurrent-triggering of the D.C. high-speed circuit breaker 3, when no commutation failure occurs in the inverters, is effected by a current comparison element 10, which monitors the value of the direct current $I_d$ via a current transformer 17. Whenever the value of current $I_d$ exceeds a predetermined limit value $I_{REF}$, the output of the current comparison element 10 actuates the triggering device 9 of the D.C. high-speed circuit breaker 3 so that the circuit breaker opens.

For the case in which the commutation voltage U drops only slightly upon occurrence of an inverter commutation failure, so that the inverter can still operate satisfactorily, the present invention provides that when the commutation voltage drop exceeds a predetermined small value, i.e. drops below a predetermined limit value $U_1$, the threshold value $I_{REF}$ for overcurrent triggering of the high-speed circuit breaker 3 is raised. Thus if the commutation voltage U drops below the predetermined limit value $U_1$, which is higher than the minimum value $U_2$, the output of comparison, or threshold, element 14 adds a threshold value component at a summation point 12 to a fixed, predetermined current limit value $I_{REF}$ 1, so that the threshold value $I_{REF}$ for overcurrent triggering is raised. The fixed value $I_{REF}$ 1 provides the normal threshold value for this purpose, whenever U is not less than $U_1$.

According to a further feature of the invention, the direct current value $I_d$ detected by the current transformer 17 is supplied to a function generator 16, which produces an output to set the minimum value $U_2$ in comparison element 15 in dependence on the value of direct current $I_d$.

FIG. 2 shows the circuit diagram of the function generator 16 consisting of a Zener-diode 161, resistors 162, 163, 164 and an operational amplifier 165. The Zener-diode 161 is barring input-signals of a voltage lower than that according to e.g. $0,3.I_d$. The value of the resistors 162, 163, 164 determines the gradient of the function gained by the amplifier 165. The input to the function generator 16 is a voltage proportional to the direct current $I_d$ detected by the current transformer 17. The output signal is the desired function $U_2 = f(I_d)$ which is fed into element 15. A preferred form of the generated function is shown in FIG. 3. The rise at $0,3.I_d$ is due to the fact that below that value of the current no protection of the inverter is necessary.

Referring now the FIG. 4, there is shown in detail the circuit of the commutation failure sensing element 8 for valve R+ of the inverter 1. The circuit consists of two Zener-diodes 81, 82, a diode 83, three resistors 85, 86, 87 a timing-member 88 and a flip-flop 89.

The output of the current transformer 18 for one phase of the line, e.g. phase R, as shown in FIG. 5a, is fed into the sensing element via the resistor 85 and across the Zener-diodes 81 and 82, thus forming current-signals of phase R as shown in FIG. 5b. These signals are rectified via the diode 84 for further use relating to valve R− in a circuit similar to that described right afterwards. The current-signals of phase R are rectified via diode 83 for further use relating to valve R+ being fed via the resistor 86 to the flip-flop 89. The rectified signal is shown in FIG. 5c. From the control device 7 the firing pulse for the valve S+, to which the current is due to commutate if there is no commutation failure, is fed to the timing member 88, which forms a signal as shown in FIG. 5d. This signal, being summed to that via the resistor 86, is fed to the flip-flop 89, too.

If there is a commutation failure the rectified current signal of valve R+ will have the form as dotted in FIG. 5c. This will cause the flip-flop 89 to output a signal for commutation failure as shown in FIG. 5e, this output signal being fed to the AND-member 13.

The commutation voltage frequency of all inverters connected to the bus 6 is determined by the line frequency. Thus the voltage transformer 19 may feed the voltage adjusted according to the winding connections of the transformer 19 to all elements 14, 15 of the parallel overcurrent protection circuits not shown.

It will be understood that the above description of the present invention is susceptible to various modifications changes and adaptations, and the same are intended to be comprehended within the meaning and range of equivalents of the appended claims.

What is claimed is:

1. In a method for operating a direct current, high-speed circuit breaker connected in series at the direct current side of one of a plurality of inverters connected in parallel in a high voltage transmission system, which method includes opening the circuit breaker when the magnitude of the direct current to the one inverter exceeds a threshold value, the improvement comprising:

monitoring the operation of the one inverter to provide an indication of each commutation failure which it experiences;

monitoring the commutation voltage at the output of the one inverter;

opening the circuit breaker in response to appearance of such a commutation failure indication only when such indication occurs simultaneously with reduction of the commutation voltage below a rated value by more than a first predetermined magnitude such that proper operation of the one inverter is no longer assured; and increasing the threshold value of the direct current from a normal value to a selected higher value in response to a reduction of the commutation voltage below the rated value by more than a second predetermined magnitude which is less than the first predetermined magnitude.

2. A method as defined in claim 1 wherein the one inverter is of a type operating with a small voltage reserve and having a given stationary voltage limit, and the first predetermined magnitude of the commutation voltage reduction is selected to be slightly above such stationary voltage limit.

3. A method as defined in claims 1 or 2 further comprising causing the first predetermined magnitude of the commutation voltage reduction to have a value dependent on the magnitude of the direct current to the one inverter.

* * * * *